US011292597B2

(12) United States Patent
Müller (10) Patent No.: US 11,292,597 B2
(45) Date of Patent: Apr. 5, 2022

(54) GLIDING SPORTS APPARATUS, WHICH IS CONTROLLABLE BY UPPER BODY AND/OR ARMS AND/OR HANDS AND/OR FINGERS

(71) Applicant: Kurt Müller, Zofingen (CH)

(72) Inventor: Kurt Müller, Zofingen (CH)

( * ) Notice: Subject to any disclaimer, the term of this patent is extended or adjusted under 35 U.S.C. 154(b) by 140 days.

(21) Appl. No.: 16/752,154

(22) Filed: Jan. 24, 2020

(65) Prior Publication Data

US 2020/0239139 A1 Jul. 30, 2020

(30) Foreign Application Priority Data

Jan. 25, 2019 (EP) .................................... 19153718

(51) Int. Cl.
*B64C 39/02* (2006.01)
*A63C 5/11* (2020.01)

(52) U.S. Cl.
CPC .............. *B64C 39/026* (2013.01); *A63C 5/11* (2013.01)

(58) Field of Classification Search
CPC . B64C 39/026; B64C 31/028; B64C 31/0285; A63C 5/11; B63H 8/00; B63H 8/14
See application file for complete search history.

(56) References Cited

U.S. PATENT DOCUMENTS

| 1,773,921 A | 8/1930 | McKinney | |
| 4,253,625 A * | 3/1981 | Dmitrowsky | B64C 39/026 244/4 A |
| 7,097,134 B1 | 8/2006 | Blum | |
| 2003/0183721 A1* | 10/2003 | Wilson | B64C 31/028 244/4 A |
| 2011/0226895 A1* | 9/2011 | Moore | B64C 39/026 244/64 |
| 2015/0210389 A1* | 7/2015 | Murdock | B64C 33/00 244/22 |
| 2017/0096211 A1* | 4/2017 | Morris | B63H 8/14 |
| 2020/0231269 A1* | 7/2020 | Woubou | B64C 31/028 |
| 2021/0053682 A1* | 2/2021 | Kuntz | B64B 1/64 |

FOREIGN PATENT DOCUMENTS

| EP | 2 762 207 A1 | 8/2014 |
| GB | 2493527 A | 2/2013 |
| WO | WO 03/106262 A1 | 12/2003 |
| WO | WO 2005/039975 A1 | 5/2005 |

* cited by examiner

*Primary Examiner* — Rodney A Bonnette
(74) *Attorney, Agent, or Firm* — Birch, Stewart, Kolasch & Birch, LLP (57) ABSTRACT

A gliding sports apparatus, which is preferably controllable by upper body and/or arms and/or hands and/or fingers, extends from a leading edge to a trailing edge in an intended direction of overflow when it is fastened to a user. The gliding sports apparatus comprises at least two shoulder ribs which extend substantially from the leading edge to the trailing edge, and wherein each of the shoulder ribs is connectable fixedly to an upper arm of the user but is rotatable about the axis of the upper arm, two hand ribs which extend substantially from the leading edge to the trailing edge, and wherein each of the hand ribs is connectable fixedly to a hand of the user, a back airfoil which is formed between the two shoulder ribs, and two arm airfoils, which are formed in each case between a shoulder rib and a hand rib.

14 Claims, 3 Drawing Sheets

GLIDING SPORTS APPARATUS, WHICH IS CONTROLLABLE BY UPPER BODY AND/OR ARMS AND/OR HANDS AND/OR FINGERS

The present invention relates to a gliding sports apparatus which is controllable by upper body and/or arms and/or hands and/or fingers.

Similar gliding or flight sports apparatuses are used for example in mountain gliding sport or water gliding sport and serve for reducing the weight of a user and providing said user with a sensation of gliding or flying. For this purpose, provision is made for the user to be situated on an underlying surface, for example on a (inclined) ground surface or on a water surface, and, for example, to move forward, and said forward movement is utilized by way of the gliding sports apparatus to generate lift. The lift force may in this case be so great that the user temporarily lifts off from the underlying surface, for example in the form of jumps, and/or floats. The user may however also remain in contact with the underlying surface at all times. In general, the user is thus subjected to lift, and a sensation of flying, even at relatively low speeds. The (forward) movement may be achieved for example by skiing or snowboarding, water skiing, downhill running, in particular in the presence of a headwind, or in a wind tunnel etc.

The lift action is dependent inter alia on the area of the gliding sports apparatus or wing, the speed of the user and the angle of attack of the gliding sports apparatus. The angle of attack is to be understood to mean the angle formed between the direction of the incident air and the profile chord of the gliding sports apparatus.

WO 03/106262 A1 has disclosed a flexible wing which comprises a multiplicity of chambers which extend in a direction of overflow and which are separated from one another by partitions. The wing is unfolded by the arms of a user, which are held out to the sides, and by the inflow of air into the chambers.

EP 2 762 207 A1 has disclosed a wing, for example likewise composed of air-filled chambers, the leading edge of which is fastened to the arms and shoulders of a user. The angle of attack of the wing is controllable by virtue of the user pivoting the trailing edge of the wing, for example by way of a ski stick.

In the case of these apparatuses, however, the primal sensation of "gliding like a bird" cannot be imparted in an authentic manner because these apparatuses are generally far too small to generate sufficient lift at speeds which are still non-hazardous, and/or because they are divided into too few segments in order to be able to be controlled in the manner of the wing of a bird, and/or because they are too rigid to transmit the lift action to the individual limbs of the person as in the case of a bird, and/or because they require, for the purposes of control, auxiliary means (for example ski sticks, connecting cords etc.) which a bird does not have. These deviations lead to a completely different manner of control of these wings in relation to a bird wing, and therefore do not impart a true sensation of bird flight.

In order that an airfoil as a sports apparatus can impart the dream of flying and has a market opportunity, it must satisfy the following criteria:
1. It must be large enough, and therefore generate sufficient lift, in order to impart the sensation of floating to the person at speeds which are still non-hazardous,
2. it must be lightweight,
3. it must be stable,
4. it must be easily and directly controllable,
5. it must be safe in order to prevent injuries,
6. it must have an optimum aerodynamic shape and nevertheless be collapsible (foldable, pivotable) so as not to impede the gliding sports participant, and the persons surrounding them, during transport (for example when ascending the mountain),
7. it must be financially affordable.

The size of an airfoil required to generate noticeable lift of around half of the body weight of a gliding sports participant of 80 kg in weight already at approximate relative speeds with respect to the air of 60 km/h (for example headwind of 20 km/h and travelling speed of 40 km/h) is a little more than 3 $m^2$. Since, as a first approximation, the lift of a wing increases firstly with the square of the speed and secondly linearly with the wing area, this value can be derived from the available data such as span, wing area, weight, flight speed and glide ratio of different animals such as flying fox, golden eagle, bearded vulture, mute swan, condor, albatross etc., or of flight apparatuses such as wingsuits of BASE jumpers, paragliders of speed flyers, delta gliders, paragliders, Otto von Lilienthal gliders etc.

From the above-stated physical formulae, it also follows that a gliding sports participant with a weight of 80 kg with an airfoil of a little larger than 3 $m^2$ can, on a steep piste with a gradient of greater than 20 degrees, lift off in the presence of a relative speed with respect to the air of around 85 km/h, and likewise also in the event of a fast increase of the angle of attack of the airfoil.

The hitherto known apparatuses do not satisfy the 7 criteria listed above.

It is the object of the present invention to provide an alternative or improved gliding sports apparatus which is controllable in particular directly, that is to say without auxiliary means such as ski sticks, control cords etc., and which is controllable easily, preferably by upper body and/or arms and/or hands and/or fingers.

Said object is achieved by way of a gliding sports apparatus according to claim 1. Refinements of the invention are specified in each case in the subclaims.

The gliding sports apparatus according to the invention is preferably controllable by upper body and/or arms and/or hands and/or fingers and extends from a leading edge to a trailing edge in an intended direction of overflow when it is fastened to a user. The gliding sports apparatus comprises at least two shoulder ribs which extend substantially from the leading edge to the trailing edge, and wherein each of the shoulder ribs is connectable fixedly to an upper arm of the user and is connectable to the upper arm so as to be rotatable about the axis of the upper arm and two hand ribs which extend substantially from the leading edge to the trailing edge, and wherein each of the hand ribs is connectable fixedly to a hand of the user. Furthermore, the gliding sports apparatus comprises at least one back airfoil which is formed between the two shoulder ribs, and two arm airfoils, which are formed in each case between a shoulder rib and a hand rib. The shoulder ribs and hand ribs (and therefore also the back airfoil and the arm airfoils) are preferably arranged symmetrically with respect to a body central longitudinal axis, for example along the spinal column, of the user.

In general, the expression "gliding sports apparatus" (hereinafter also referred to as "wing") is to be understood to mean an apparatus which, in the presence of movement of the user, generates lift and thus serves, at least at a sufficient speed, to reduce the weight of the user and impart to the user the sensation of gliding and/or floating. The expression "gliding sports apparatus" or "wing" does not imperatively necessitate flight in the conventional sense, that is to say the lift-off of the user from the underlying surface. The user is correspondingly also referred to as "gliding sports participant".

The intended direction of overflow refers to the direction in which the air passes over the gliding sports apparatus or the wing when the user moves, that is to say generally (with the exception of possible ground winds) the direction opposite to the direction of movement of the user. The leading edge of the wing need not be formed continuously over the entire width (that is to say transversely with respect to the intended direction of overflow) of the wing. It may for example be interrupted in the region of the user by virtue of the leading edge of the wing being guided along at least partially around the user, in particular behind the back of the user. The trailing edge of the wing is preferably formed continuously over the entire width of the wing.

The statement that the hand ribs, shoulder ribs and further ribs, mentioned further below, of the wing, are connectable or connected fixedly to the hand or to the upper arm (generally: to the arm of the user) means that the position and attitude, in particular angular attitude, of the ribs relative to the hand and to the lower arm of the user is fixed and invariable (at least during the use of the gliding sports apparatus). The shoulder rib can however be rotated about the upper-arm axis. This rules out slippage, pivoting etc. of the ribs in relation to the arm. This permits, for example, a good transmission of force from the hand and the lower arm of the user to the wing and thus direct controllability of the wing, that is to say in particular without further auxiliary means such as for example control cords and/or ski sticks. In particular, it is thus possible to control the angles of attack of the airfoils by pivoting or tilting the corresponding ribs. The angle of attack of the shoulder rib is controlled by leaning forward. In this way, a good transmission of force from the wing to the user can also be made possible, resulting in a sensation of "gliding like a bird".

In general, good controllability of the wing can be made possible by way of this segmented construction of the wing (segments are understood to mean the various airfoils, that is to say the back and arm airfoils, and further airfoils mentioned further below). Since the hand rib is connectable, or during operation is connected, to the hand, and the shoulder rib is connected to the arm receptacle half-shell (see below), these are movable relative to one another by wrist and elbow joint, which can increase the adjustability of the airfoil segments relative to one another and thus the controllability of the wing.

A wing is thus provided which has a lightweight, stable, directly controllable and safe airfoil of approximately 2.8 m$^2$ to approximately 4.5 m$^2$, which can be controlled by upper body, shoulders, arms, elbows, hands and fingers such that the lift is transmitted to the individual limbs of the person, which imparts to the user the sensation of "gliding like a bird". Owing to the dimensioning, it imparts the experience of gliding already at non-hazardous speeds. Despite the required size, it is foldable such that it does not impede the gliding sports participant and other persons during transport in an automobile, in cable cars, mountain railways, gondola cableways, on chairlifts, ski lifts etc.

The airfoils are preferably composed of a flexible material, such as for example a fabric and/or a foil. This makes it possible, for example, for the wing to be easily collapsed or folded, in particular for transport purposes, and provides, for example, a lightweight material for the wing.

The ribs may be manufactured in a lightweight construction, so as to be rigid, that is to say not bendable or flexible, for example from a metal and/or carbon. In this way, a good transmission of force between wing and user can be achieved. Alternatively, the ribs may be of flexible form, for example composed of the same material as the airfoils, which can further reduce the weight of the wing.

Preferably, the gliding sports apparatus furthermore comprises two arm ribs which extend substantially from the leading edge to the trailing edge, and wherein each of the arm ribs is connectable fixedly to an underarm of the user such that each of the two arm airfoils is divided into an upper-arm airfoil, which is formed between the respective shoulder rib and arm rib, and a lower-arm airfoil, which is formed between the respective arm rib and hand rib. Preferably, the arrangement of the arm ribs and thus the shape of the upper-arm and lower-arm airfoils are likewise symmetrical with respect to one another.

By way of the division of the arm airfoils into upper-arm and lower-arm airfoils, and in particular owing to the fact that the shoulder, arm and hand ribs are movable relative to one another by the joints of the user (elbow joint and hand joint), the controllability of the wing can be further increased, and the sensation of gliding can be further improved.

Preferably, the gliding sports apparatus furthermore comprises two lower-arm elongations which are in each case connectable fixedly to a lower arm of the user and which extend substantially as an elongation of the lower arm, in particular when the gliding sports apparatus is fastened to the user, and wherein at least in each case one finger airfoil is formed between a lower-arm elongation and the respective hand rib. The gliding sports apparatus furthermore more preferably comprises at least one, even more preferably eight, finger ribs, which is/are in each case connectable fixedly to a finger of the user and extend(s) substantially as an elongation of the respective finger, in particular when the gliding sports apparatus is fastened to the user, and wherein a multiplicity of finger airfoils is formed between the respective lower-arm elongation, the hand rib and the finger rib(s).

It is pointed out at this juncture that the general expression "rib(s)" used above and below means not only the shoulder, arm, hand and finger ribs but additionally also encompasses the lower-arm elongations.

Through the provision of the finger airfoils, the total area of the wing can be enlarged, which increases the lift force. Furthermore, the fixed connection of the finger ribs to the fingers of the user permits direct controllability, in particular of the angle of attack, of the finger airfoils. The finger airfoils preferably correspond to the flying membranes of bats, flying foxes or pterosaurs, and/or are of single-layer form.

It is furthermore preferable if at least one lower-arm elongation is formed in two parts, wherein a first portion of the lower-arm elongation is connectable fixedly to the lower arm, and a second portion of the lower-arm elongation is movable relative to the first portion, in particular such that the second portion and the finger ribs or finger airfoils are pivotable in the direction of the hand rib of the user. Here, the second portions of the lower-arm elongation may for example be connected to one another by way of a lockable joint. By pivoting these portions and the finger airfoils over, these can for example be laid onto the hand ribs and fastened there. The wing area is thus reduced, which may be advantageous for example for transport purposes (on mountain railways, chairlifts, ski lifts etc.) or else for training purposes and/or in particular for safety purposes in the presence of a strong headwind and/or excessive lift.

Alternatively or in addition, the lower-arm elongations have upwardly curved portions at their ends averted from the arms. These so-called winglets serve for reducing the air resistance of the wing by way of an enlargement of the radii of the wake vortices and thus a reduction of the air speed in the wake vortices (the energy loss is proportional to the square of the speed of the air in the wake vortices).

The gliding sports apparatus preferably furthermore comprises a receiving element for at least partially receiving an arm of the user, wherein a shoulder rib and/or an arm rib and/or a lower-arm elongation is or are fastened fixedly to the receiving element. It is furthermore preferable if the receiving element is formed from an upper-arm receiving element for receiving the upper arm and a lower-arm receiving element for receiving the lower arm, which are connected to one another by way of a flexible connection and which, together, form a torsionally stable receiving element, and wherein the shoulder rib is provided on the upper-arm receiving element and the arm rib is provided on the lower-arm receiving element.

The flexible connection may for example be a corrugated bellows in the region of the elbow, which permits flexion and extension of the elbow joint. The expression "torsionally stable" means here that the upper-arm and lower-arm receiving element, and also the flexible connection, are not rotatable relative to one another. By way of such rotation prevention, it is for example made possible for a variation of the angle of attack of the shoulder rib (by leaning forward) to be transmitted to the arm rib, and vice versa. Overall, the receiving element can impart high strength to the wing and thus permit a good transmission of force between user and wing.

The gliding sports apparatus preferably furthermore comprises back connection means which are designed for connecting the back airfoil and/or shoulder rib, in particular in a region close to the trailing edge of the back airfoil or shoulder rib, to the back of the user, in particular in a region of the lower back, wherein the back connection means are more preferably designed to be adjustable in length.

It is furthermore preferable if the back connection means are designed to connect the back airfoil to the entire length of the back from the neck to the coccyx, and/or connect the shoulder rib to the loins. Such back connection means may for example be one or more cords and/or a fabric or a foil. The back connection means permit, for example, control of the angle of attack of the back airfoil and/or of the shoulder ribs by tilting the upper body (leaning forward). Furthermore, the back connection means can limit the angle of attack.

Preferably, a fixed element, more preferably a rod-shaped or tubular element, is provided at the trailing edge at least between two of the ribs. The fixed element between the ends of the ribs may for example serve as a distancing element between the respective ribs, that is to say for tensioning the corresponding airfoil, and may be formed for example as carbon tubes.

The gliding sports apparatus preferably furthermore comprises shoulder rib connection means which connect at least one shoulder rib in the region of the trailing edge to an arm rib close to the arm of the user, in particular when the gliding sports apparatus is fastened to the user, and/or arm rib connection means which connect at least one arm rib in the region of the trailing edge to a hand rib close to the hand of the user, in particular when the gliding sports apparatus is fastened to the user. The shoulder rib connection means may for example serve for tensioning the back airfoil, and the arm rib connection means may for example serve for tensioning the upper-arm airfoils.

The gliding sports apparatus preferably furthermore comprises at least one safety joint at a shoulder rib and/or an arm rib and/or a hand rib and/or a lower-arm elongation and/or a finger rib, wherein the safety joint is designed to detach in the event of overloading of the respective element. With such a safety joint, it is for example possible for injuries to the user, in particular as a result of a crash, to be prevented or at least reduced.

The gliding sports apparatus preferably furthermore comprises hand-receiving means for receiving the hands of the user, wherein the hand ribs are fastened fixedly to the hand-receiving means. Said hand-receiving means may for example be in the form of gloves. It is preferable here for the thumb to remain free in order to be able to use this for gripping. The hand ribs can be connected fixedly for example to the hands of the user by such hand-receiving means.

Preferably, the shoulder ribs and/or the arm ribs and/or the hand ribs are rigid in a vertical direction and flexible in a horizontal direction in order to further reduce the risk of injury to the gliding sports participant in the event of a crash.

Preferably, the back airfoil and the arm airfoils or the upper-arm airfoils and lower-arm airfoils each have a top side and a bottom side spaced apart from the top side, wherein the respective ribs more preferably act as distancing elements between the top side and the bottom side, and/or wherein the gliding sports apparatus preferably furthermore comprises air inlet openings for admitting air into the intermediate space formed between the top side and the bottom side.

It is furthermore preferable if the top side and the bottom side form a space which is substantially completely closed with the exception of the air inlet openings, and which is delimited laterally by the hand ribs. The wing profile, that is to say a section area along the intended direction of overflow, is in this case defined preferably by the ribs, and furthermore has for example the shape of airfoils of an aircraft or of bird wings. Chambers are preferably formed between the respective ribs, wherein a positive air pressure in the chambers serves for tensioning the airfoils. Preferably, the ribs are extended through by recesses (holes) in order to enable the positive air pressure to propagate between the chambers.

It is furthermore preferable if the shoulder ribs, the arm ribs and/or the hand ribs are each formed from a flexible material. In this way, the wing can for example be folded even smaller, for example for transport purposes.

It is preferable if, above the main airfoil formed from back airfoil and arm airfoils or upper-arm airfoils and lower-arm airfoils, there is provided at least one further, preferably flexible airfoil which is connected to the main airfoil, preferably such that, between the main airfoil and the further airfoil, there are formed air chambers which extend substantially in the intended direction of overflow. By way of this double-decker effect, it is for example possible for a flow separation to be delayed. Furthermore, the lift of the wing is improved.

Further features and expedient aspects of the invention will emerge from the description of exemplary embodiments on the basis of the appended drawings.

Figure 1:
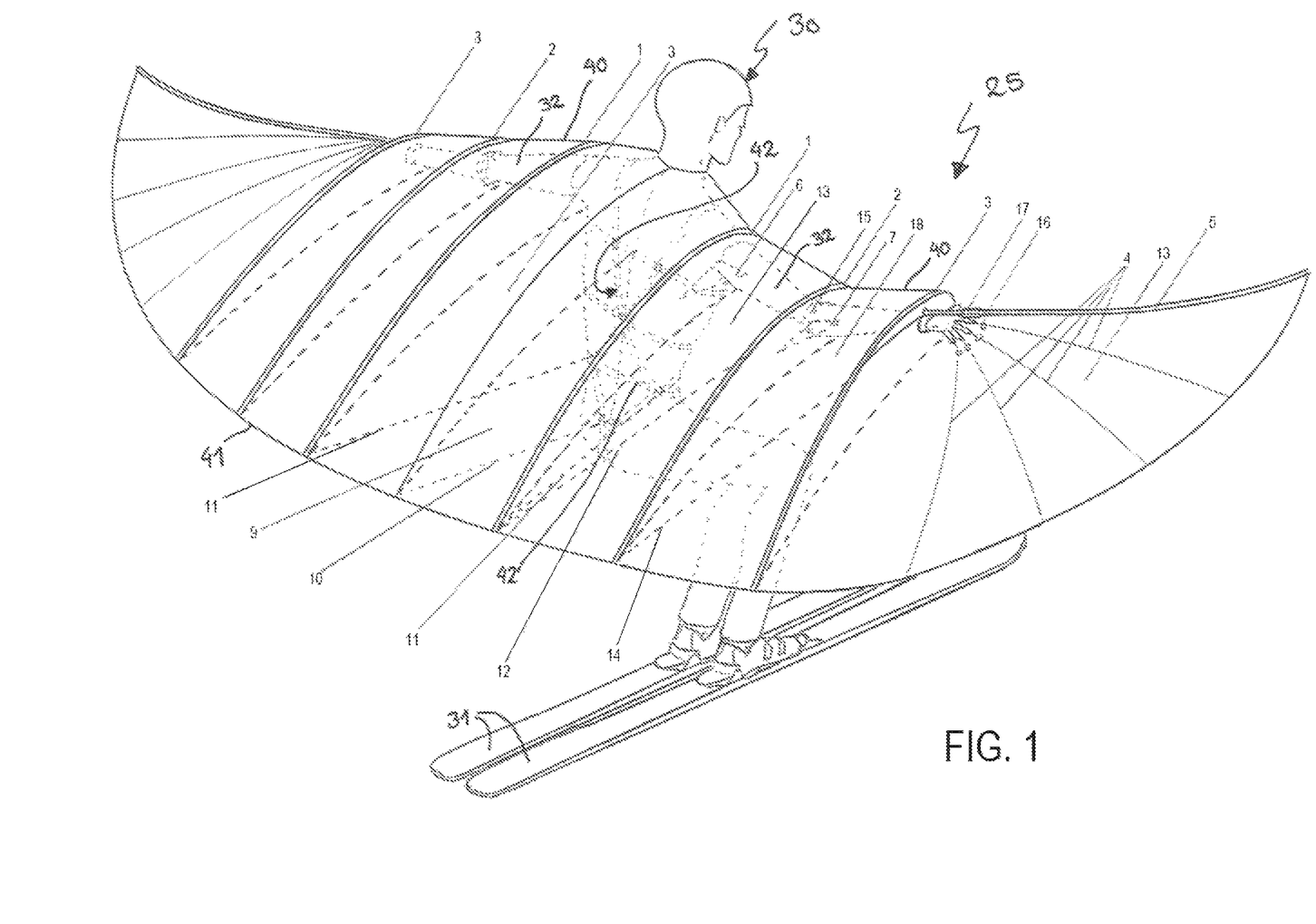
FIG. 1 shows a schematic view of a wing according to an embodiment of the present invention fastened to a user.
Figure 2:
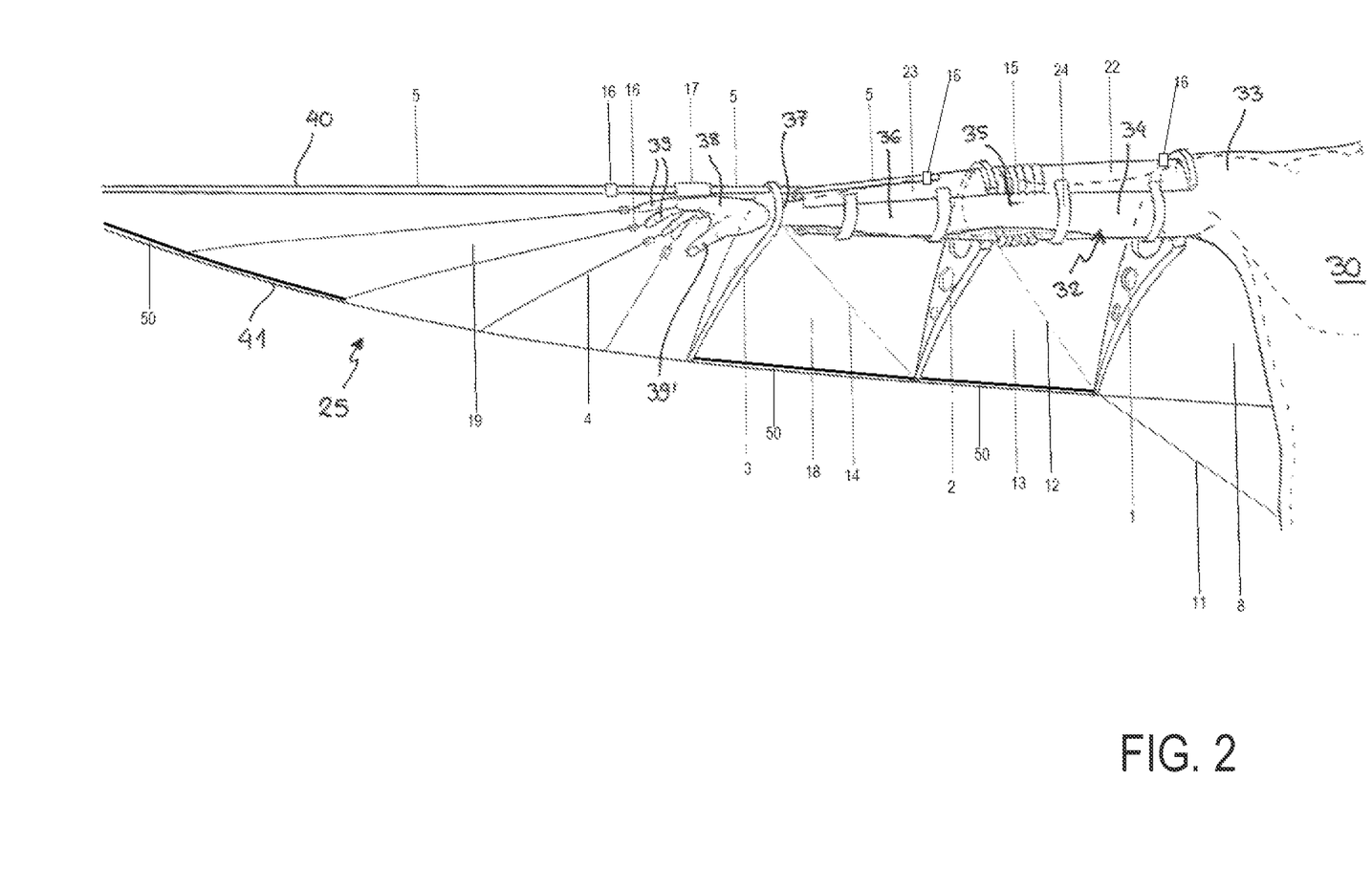
FIG. 2 shows a detail, comprising the right-hand arm of the user, of the wing shown in FIG. 1.
Figure 3:
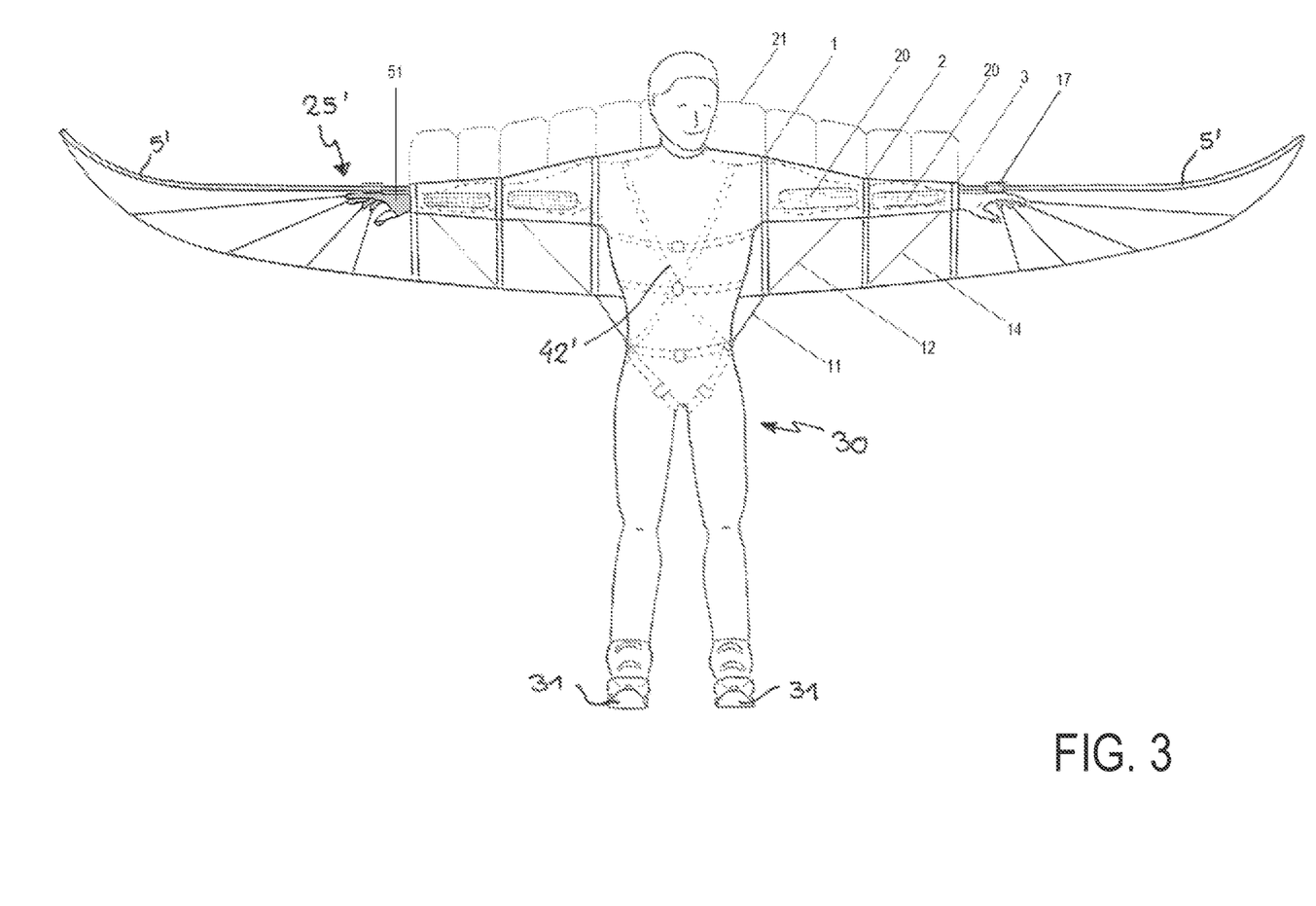
FIG. 3 shows a view of the user from the front with a wing according to refinements of the invention.

FIGS. 1 to 3 show a gliding sports participant or user 30 with skis 31, to which gliding sports participant or user a gliding sports apparatus according to the invention in the form of a wing 25 is attached. FIG. 2 shows only the right-hand arm of the user 30 and the corresponding right-hand wing portion; the left-hand wing portion fastened to the left-hand arm is of analogous, that is to say mirror-symmetrical, form with respect to the right-hand wing portion.

Construction

The wing is preferably produced in a mixed construction (rigid and flexible), and is thus stable and can nevertheless be folded.

The wing 25 extends in an intended direction of overflow from a leading edge 40, the incident-flow edge, to a trailing edge 41. The wing 25 is formed from a centrally provided back airfoil 8 and, symmetrically with respect thereto, in each case two upper-arm airfoils 13, in each case two lower-arm airfoils 18 and in each case five finger airfoils 19. Each of the airfoils 8, 13, 18, 19 is delimited by two ribs (shoulder ribs 1, arm ribs 2, hand ribs 3, finger ribs 4, lower-arm elongation 5), or is formed in each case between two of these ribs. In the embodiment shown in FIGS. 1 to 3, the wing or the airfoils is of single-layer form, that is to say is formed as a flying membrane, by virtue of fabric or foil being fastened to the ribs and tensioned between these. Preferably, the fabric or the foil is fastened to the top sides of the ribs, such that the ribs are covered upwardly by the fabric or the foil (see FIG. 1) and the ribs are visible at the bottom side of the wing (see FIG. 2).

The fabric or the foil is preferably flexible, preferably manufactured from the same material as paragliders, wingsuits etc., whereas the ribs are preferably rigid and connected fixedly to the arms 32 of the user 30.

As shown in FIG. 2, the arm 32 of the user 30 is fastened in or on a receiving element, which is formed from a rigid upper-arm half-shell 22 as upper-arm receiving element, a rigid lower-arm half-shell 23 as lower-arm receiving element, and a flexible connection as elbow connection, which connects the upper-arm half-shell 22 and the lower-arm half-shell 23 to one another. The upper-arm and lower-arm half-shells 22, 23 may be formed for example from carbon. The upper-arm half-shell 22 at least partially surrounds the upper arm 34, preferably over the entire length thereof, and, in a circumferential direction of the upper arm 34, at least partially, in particular at the top and at the rear, that is to say at that side of said upper arm which faces toward the trailing edge 41 and the top side of the wing 25. Analogously, the lower-arm half-shell 23 surrounds the lower arm 36 at least partially, preferably over the entire length thereof, and, in a circumferential direction of the lower arm, at least partially, in particular at the top and at the rear, that is to say at that side of said lower arm which faces toward the trailing edge 41 and the top side of the wing 25. The upper-arm half-shell 22 and the lower-arm half-shell 23 are fastened fixedly to the upper arm 34 or lower arm 36 respectively of the user by detachable fastener means 24 such as for example buckles, straps, hook-and-loop fasteners etc. In the region of the elbow 35, the flexible connection 15 (elbow connection) is provided, for example in the form of a torsionally stable corrugated bellows, in order to connect the lower-arm half-shell 23 and the upper-arm half-shell 22 to one another and simultaneously permit a relative movement of the half-shells with respect to one another, in particular a flexion of the elbow 35, but prevent torsion (that is to say a rotation along the arm longitudinal axis) of the half-shells with respect to one another and/or relative to the arm 32 of the user 30.

FIG. 2 shows half-shells 22, 23 as a receiving element for the arm, which half-shells surround the arm (upper arm or lower arm) only partially. The receiving element or the upper-arm and/or lower-arm receiving element may also fully surround the upper arm and/or lower arm respectively in the circumferential direction, and be formed for example as a rigid sleeve.

The shoulder rib 1 is provided in the region of the shoulder 33 and is connected to the upper-arm half-shell 22, or fastened to the latter such that the shoulder rib is rotatable about the axis of the upper arm. The arm rib 2 is provided in the region of the elbow 35 and is fixedly connected to the lower-arm half-shell 23, or fixedly fastened to the latter, such that the position and (angular) attitude of the arm rib 2 in relation to the plane formed between the upper arm 35 and lower arm 36 is fixed. The upper-arm and lower-arm half-shells 22, 23 may in this case be connected to the shoulder rib 1 and arm rib 2 respectively such that the upper-arm and lower-arm half-shells 22, 23 are provided in the region of the leading edge 40 of the wing 25 (as shown in FIGS. 1 and 2) and/or in the region of the center of lift of the wing 25 and/or in a region between the leading edge 40 and the center of lift of the wing 25 (not shown in the figures).

Furthermore, the wing 25 comprises a hand rib 3, which is provided in the region of the wrist 37 and which is connected fixedly to the hand 38, for example to the palm, of the user 30, or fastened fixedly thereto, such that the position and (angular) attitude of the hand rib 3 in relation to the hand 38 is fixed. Preferably, for this purpose, the hand rib 3 is fastened fixedly to a hand-receiving means (not shown) for receiving the hand 38 of the user 30, for example a glove.

The shoulder rib 1, arm rib 2 and hand rib 3 extend in this case substantially from the arm 32 of the user 30 in the direction of the trailing edge 41 of the wing, preferably at an angle of substantially 90° with respect to the arm 32 or with respect to the respective arm segment (upper arm 34, lower arm 36 or hand 38 respectively). The shoulder rib 1, arm rib 2 and hand rib 3 preferably have the shape of airfoils of an aircraft or of bird wings. The shoulder rib 1, arm rib 2 and hand rib 3 are preferably produced in a lightweight construction, for example from carbon, and are preferably vertically rigid and horizontally flexible in order to prevent injuries. Preferably, they are equipped with safety joints (not shown) close to the arm 32, which safety joints are, for example in the event of a crash, detached in order to prevent injuries. Furthermore, the shoulder rib 1 and arm rib 2 are preferably extended through by recesses or holes.

The lower-arm elongation 5 is likewise a rib, which is provided as an elongation of the lower arm 36 and is connected fixedly to the lower-arm half-shell 23, or fastened fixedly thereto, such that the position and (angular) attitude of the lower-arm elongation 5 in relation to the lower arm 36 is fixed. The lower-arm elongation 5 may, as shown for example in FIG. 2, be fastened to the top side of the lower-arm half-shell 23 and led through the hand rib 3.

The four finger ribs 4 are provided in each case as an elongation of a finger 39 (index, middle, ring and little finger) and are connected fixedly to the respective finger, or fastened fixedly thereto, for example by way of the above-mentioned hand-receiving means for receiving the hand 38 (for example a glove) and/or finger sleeves. Thus, the position and (angular) attitude of the finger ribs 4 in relation to the respective finger 39 is fixed. The thumb 39' is preferably free, that is to say not connected to a finger rib.

The lower-arm elongation 5 and finger ribs 4 may be formed for example as thin rods and/or tubes and formed for example from carbon. The lower-arm elongation 5 and/or the finger ribs 4 are also preferably equipped with safety joints 16, for example snap-action joints, close to the fingers 39 or close to the hand 38, which safety joints are, for example in the event of a crash, detached in order to prevent injuries. Furthermore, the lower-arm elongation 5 is preferably formed in two parts, wherein a first portion of the lower-arm elongation is connected fixedly to the lower arm 36 or to the lower-arm half-shell 23, and a second portion of the lower-arm elongation 5 in the region of the finger airfoils 19 is movable in relation to the first portion. The two portions of the lower-arm elongation 5 are connected to one another for example by way of a pivotable connection 17, for example a lockable hinge or joint, such that the second portion with the finger ribs 4 or finger airfoils 19 can be laid against the hand rib 3 and fastened there.

As mentioned above, on in each case one arm 23 of the user 30, there is provided in each case one shoulder rib 1, one arm rib 2, one hand rib 3, one lower-arm elongation and four finger ribs 4, preferably such that the respective right-hand and left-hand ribs are formed and arranged symmetrically with respect to one another. The back airfoil 8 is formed between the shoulder ribs 1, the upper-arm airfoils 13 are formed in each case between shoulder rib 1 and arm rib 2, the lower-arm airfoils 18 are formed in each case between arm rib 2 and hand rib 3, and the finger airfoils 19 are formed between the finger ribs 4 and between lower-arm elongation 5 or hand rib 3 and the nearest finger rib 4.

The wing 25 and/or the shoulder ribs 1 are connected by back connection means 9, 10, 11 to the (upper) body and/or to the loins of the gliding sports participant 30, who is preferably wearing a body harness 42', as used for example in climbing, paragliding and/or parachuting sports. As back connection means, in FIG. 1, a fabric and/or a foil 9 is provided which connects the back airfoil 8, preferably centrally between the shoulder ribs 1, areally to the back 42, preferably along the entire length of the back 42 from the neck to the coccyx. Alternatively or in addition, in FIG. 1, a connecting cord 10 is provided as back connection means, which connecting cord connects the trailing edge 10, proceeding from the center of the back airfoil 8, to the lower back of the user. Alternatively or in addition, in FIG. 1, connecting cords 11 are provided as back connection means, which connecting cords connect the shoulder ribs 1 at the trailing edge 41 to the loins of the user 30. The connecting cords 10, 11 and/or the fabric or foil 9 are preferably designed to be adjustable in length.

Optionally, at the trailing edge 41 of the wing 25, fixed elements, for example carbon tubes, are provided (not shown) between the ribs 1, 2, 3, 4, 5, which fixed elements connect respectively adjacent ribs to one another.

Optionally, for the purposes of tensioning the airfoils, the wing 25 comprises shoulder rib connection means, for example connecting cords 12, which connect the shoulder ribs 1 in the region of the trailing edge 41 to the arm ribs 2 close to the arm 32 or in the region of the elbow 35 of the user 30, and/or arm rib connection means, for example connecting cords 14, which connect the arm ribs 2 in the region of the trailing edge 41 to the hand ribs 3 close to the hand 38 or in the region of the wrist 37 of the user 30 (see FIGS. 1 and 2).

Optionally, the wing 25 comprises fixed connections between the shoulder ribs 1 and the upper-arm half-shells 22, illustrated schematically in FIG. 1 by triangles 6, and/or fixed connections between the arm ribs 2 and the lower-arm half-shells 23, illustrated schematically in FIG. 1 by triangles 7.

The wing is preferably integrated into a jacket and/or an overall which can in particular be easily removed. The jacket or the overall is furthermore preferably closely tailored or designed to lie closely against the body in order to minimize the air resistance.

The wing 25 may for example have a total area of between approximately 2.8 $m^2$ and approximately 4.5 $m^2$. The length of the wing (that is to say the distance between leading edge 40 and trailing edge 41) in the rest state preferably extends as far as the hollows of the knees or as far as the calves of the user. The user can thus sit comfortably on the back airfoil 8, for example on chairlifts.

Refinements of the invention will be described below with reference to FIG. 3. The wing 25 described above with reference to FIGS. 1 to 3 is of single-layer form, that is to say a single layer of the fabric or of the foil is tensioned between the shoulder ribs 1, arm ribs 2 and hand ribs 3 in order to form the airfoil segments (back airfoil 8, upper-arm airfoil 13, lower-arm airfoil 18). In a first refinement of the invention, the wing 25' may also be of two-layer form, that is to say the airfoil segments (back airfoil 8, upper-arm airfoil 13, lower-arm airfoil 18) are formed from two plies or layers of the fabric/foil which are spaced apart vertically from one another and which are each fastened to the ribs (shoulder ribs 1, arm ribs 2 and hand ribs 3). Preferably, the upper layer, which forms the top side of the wing 25' (first fabric or foil), is fastened to the top side of the ribs 1, 2, 3, and the lower layer, which forms the bottom side of the wing 25' (second fabric or foil), is fastened to the bottom side of the ribs. The top side and bottom side of the wing 25' thus enclose a volume with one another which is divided by the shoulder ribs 1, arm ribs 2 and hand ribs 3 into chambers. The shoulder ribs 1, arm ribs 2 and hand ribs 3 serve here as distancing elements between the top side and bottom side of the wing 25', and provide the wing with its aerodynamic profile shape. Preferably, at least the shoulder ribs 1 and arm ribs 2 have recesses or holes in order to permit a flow of air into adjoining chambers. Optionally, distancing elements between the upper and lower airfoil fabric (or the foils) are shaped and arranged such that the profile shape of the adjoining ribs is assumed.

Air inlet openings 20 are preferably provided on the front side or in the vicinity of the arms 32 of the user.

In the case of this two-layer wing according to the first refinement, the back airfoil 8, the upper-arm airfoils 13 and the lower-arm airfoils 18 may be tensioned, alternatively or in addition to the means and methods described below, by positive air pressure in the chambers. The positive air pressure is generated in this case by the air flowing into the chambers through the air inlet openings 20 as the user moves. In particular in the case of a wing according to the first refinement, the shoulder ribs 1, arm ribs 2 and hand ribs 3 may also be designed as flexible ribs, which are manufactured for example from the same material as the fabric or the foil of the airfoils.

In order to boost the lift of the wing, in a second refinement of the invention, a second airfoil 21 is provided (see FIG. 3) above the main airfoil formed from back airfoil 8, upper-arm airfoils 13 and lower-arm airfoils 18. Said second airfoil 21 is preferably flexible and connected to the main airfoil such that air chambers 21' are formed between the main airfoil and the second airfoil 21. Said air chambers may for example be connected to the above-described air inlet openings 20 of the main airfoil and/or have separate air inlet openings. The wing 25' according to the second refinement is thus of analogous design to a double-decker.

Accordingly, above the second airfoil, there may be provided one or more further airfoils which are designed analogously to the second airfoil and which are connected to the airfoil situated underneath (3-decker and multi-decker).

According to a third refinement of the invention shown in FIG. 3, the ends of the wing 25' are curved upward (analogously to "winglets" in the case of an aircraft airfoil).

Here, one or more of the three refinements described above with regard to FIG. 3 may be utilized for the refinement of the wing described above.

The finger airfoils 19 of the wing 25, 25' are formed in a single layer from one fabric or one foil. Alternatively, they may also be formed from individual feathers which are fastened instead of the above-described finger ribs 4 to the fingers 39 and which can be controlled by the fingers 39. The wing 25, 25' may also be formed without finger airfoils 19.

Furthermore, the above-described wing 25, 25' may be formed without arm ribs 2. Instead of the upper-arm and lower-arm airfoils 13, 18, the wing then has only two arm airfoils, which are formed in each case between a shoulder rib and a hand rib (not shown in the figures).

Provision and Control

For the commencement of operation of the wing 25, 25', the following approach is followed: firstly, the upper arms 34 and lower arms 36 of the user 30 are inserted into the respective upper-arm half-shells 22 and lower-arm half-shells 23 and fastened thereto by the fastener means 24.

The hands 38 are fastened to the hand ribs 3, and the fingers 39 are fastened to the finger ribs 4, for example by the hand-receiving means (gloves) which are not shown.

Then, the user 30 starts to move, for example by travelling down a snow-covered mountain slope with the aid of the skis 31. Here, the relative wind flows around the wing 25, 25' in a direction of overflow counter to the direction of travel, and thus generates a lift force, which acts on the wing 25, 25' and thus also on the user 30 connected to the wing 25, 25'.

To tension the airfoils before and/or during the movement of the user 30, the following approach is followed: the back airfoil 8 is tensioned by moving the upper arms 34 forward, in particular in conjunction with the fixed connections between the shoulder ribs 1 and the upper-arm half-shells 22 (illustrated schematically in FIG. 1 by triangles 6). Alternatively or in addition, the back airfoil 8 is tensioned by way of the abovementioned fixed connecting element (not shown in the figures), for example a carbon tube, which is provided at the trailing edge 41 of the wing 25, 25' between the shoulder ribs 1. Alternatively or in addition, the back airfoil 8 is tensioned by the connecting cords 12 which connect the shoulder ribs 1 in the region of the trailing edge 41 to the arm ribs 2 close to the arm 32.

The upper-arm airfoils 13 are tensioned by flexion of the elbow 35, in particular in conjunction with the fixed connections between the arm ribs 2 and the lower-arm half-shells 23 (illustrated schematically in FIG. 1 by triangles 7). Alternatively or in addition, the upper-arm airfoils 13 are tensioned by way of the abovementioned fixed connecting elements, for example carbon tubes, which are provided in each case at the trailing edge 41 of the wing 25, 25' between shoulder rib 1 and arm rib 2. Alternatively or in addition, the upper-arm airfoils 13 are tensioned by way of the connecting cords 14 which connect the arm ribs 2 in the region of the trailing edge 41 to the hand ribs 3 close to the hand 38.

The lower-arm airfoils 18 are tensioned by rotating the hands forward. Alternatively or in addition, the lower-arm airfoils 18 are tensioned by way of the abovementioned fixed connection elements (not shown in the figures), for example carbon tubes, which are provided in each case at the trailing edge 41 of the wing 25, 25' between arm rib 2 and hand rib 3. The finger airfoils 19 are tensioned by way of the (predefined or fixed) angle between the lower-arm elongations 5 and the hand ribs 3.

The angles of attack of the airfoils may be set or controlled as follows: the angle of attack of the back airfoil 8 is controlled by way of the inclination of the upper body of the user 30 (by leaning forward). The fine control may additionally be performed by raising and/or lowering the shoulders 33 (by way of the shoulder joints). The angle of attack of the shoulder ribs 1 is likewise controlled by way of the inclination of the upper body of the user 30 (by leaning forward), and is set by way of the connecting cords 11, which are preferably designed to be adjustable in length, such that the angle of attack can be set differently.

The angle of attack of the upper-arm airfoils 13 is controlled by way of the shoulder ribs 1 and the arm ribs 2. The angle of attack, controlled by inclination of the upper body (by leaning forward), of the shoulder ribs 1 is transmitted via the torsionally stable upper-arm half-shells 22, flexible connection 15 (elbow connection) and lower-arm half-shells 23 to the arm ribs 2. Additionally, the angle of attack of the arm ribs 2 may be controlled by way of the plane formed by the easily angled arms. By lowering the elbows 35, the angle of attack of the arm ribs 2, and thus of the upper-arm airfoils 13 and lower-arm airfoils 18, can be increased.

The angle of attack of the lower-arm airfoils 18 is controlled by way of the arm ribs 2 and the hand ribs 3. The angle of attack of the hand ribs 3 is increased by rotating the edges of the hands downwards.

The angle of attack of the finger airfoils 19 is controlled by way of the lower-arm elongations 5 and the hand ribs 3. The fine control is performed, by way of the finger ribs 4, by flexion of the fingers.

The V shape and arrow shape of the lower-arm elongations 5 are controlled by way of the posture of the lower arms.

In the above-described embodiment of the invention, the movement (propulsion) of the user is effected by travelling down a snow-covered mountain slope using skis 31. Alternatively, the (forward) movement of the user may also be effected in some other way, for example by snowboarding, water skiing, downhill running, in particular in the presence of a headwind, or in a wind tunnel etc.

The invention claimed is:

1. Foldable gliding sports apparatus, which foldable gliding sports apparatus extends from a leading edge to a trailing edge in an intended direction of overflow when it is fastened to a user, and wherein the foldable gliding sports apparatus at least comprises:
   two shoulder ribs which extend from the leading edge to the trailing edge, and wherein each of the shoulder ribs is connectable fixedly to an upper arm of the user but is rotatable about the axis of the upper arm,
   two arm ribs which extend from the leading edge to the trailing edge, and wherein each of the arm ribs is fixedly connectable to a lower arm of the user;
   two hand ribs which extend from the leading edge to the trailing edge, and wherein each of the hand ribs is connectable fixedly to a hand of the user,
   a back airfoil which is formed between the two shoulder ribs, and two arm airfoils, which are formed in each case between a shoulder rib and a hand rib, wherein each of the two arm airfoils is divided into an upper-arm airfoil, which is formed between the respective shoulder rib and arm rib, and a lower-arm airfoil, which is formed between the respective arm rib and hand rib; and wherein the foldable gliding sports apparatus comprises a receiving element for at least partially receiving an arm of the user, wherein the shoulder rib and the arm rib are fastened fixedly to the receiving element, wherein the receiving element is formed from an upper-arm receiving element for receiving the upper arm and a lower-arm receiving element for receiving the lower arm, which are connected to one another by way of a flexible connection and which, together, form a torsionally stable receiving element, and wherein the shoulder rib is provided on the upper-arm receiving element and the arm rib is provided on the lower-arm receiving element.

2. Foldable gliding sports apparatus according to claim 1, furthermore comprising two lower-arm elongations which are in each case connectable fixedly to the lower-arm receiving element and which extend as an elongation of the lower arm, and wherein at least in each case one finger airfoil is formed between a lower-arm elongation and the respective hand rib, furthermore comprising at least one finger ribs, which is in each case connectable fixedly to a finger of the user and extends as an elongation of the respective finger, and wherein a multiplicity of finger airfoils is formed between the respective lower-arm elongation, the hand rib and the at least one finger rib.

3. Foldable gliding sports apparatus according to claim 2, wherein at least one lower-arm elongation is formed in two parts, wherein a first portion of the lower-arm elongation is connectable fixedly to the lower arm, and a second portion of the lower-arm elongation is movable relative to the first portion such that the second portion and the finger ribs or finger airfoils are pivotable in the direction of the hand rib of the user.

4. Foldable gliding sports apparatus according to claim 2, wherein the lower-arm elongations have upwardly curved portions at their ends averted from the arms.

5. Foldable gliding sports apparatus according to claim 1, furthermore comprising back connection means which are designed for connecting the back airfoil and/or shoulder rib in a region close to the trailing edge of the back airfoil or shoulder rib, to the back of the user and wherein the back connection means are designed to be adjustable in length.

6. Foldable gliding sports apparatus according to claim 1, wherein a fixed element is provided at the trailing edge at least between two of the ribs.

7. Foldable gliding sports apparatus according to claim 1, furthermore comprising shoulder rib connection means which connect at least one shoulder rib in the region of the trailing edge to an arm rib close to the arm of the user, and/or comprising arm rib connection means which connect at least one arm rib in the region of the trailing edge to a hand rib close to the hand of the user.

8. Foldable gliding sports apparatus according to claim 1, furthermore comprising at least one safety joint at a shoulder rib and/or an arm rib and/or a hand rib and/or a lower-arm elongation and/or a finger rib, wherein the safety joint is designed to detach in the event of overloading of the respective element.

9. Foldable gliding sports apparatus according to claim 1, furthermore comprising hand-receiving means for receiving the hands of the user, wherein the hand ribs are fastened fixedly to the hand-receiving means.

10. Foldable gliding sports apparatus according to claim 1, wherein the shoulder ribs and/or the arm ribs and/or the hand ribs are rigid in a vertical direction and flexible in a horizontal direction.

11. Foldable gliding sports apparatus according to claim 1, wherein the back airfoil and the arm airfoils or the upper-arm airfoils and lower-arm airfoils each have a top side and a bottom side spaced apart from the top side, wherein the respective ribs act as distancing elements between the top side and the bottom side, and/or wherein the gliding sports apparatus furthermore comprises air inlet openings for admitting air into the intermediate space formed between the top side and the bottom side.

12. Foldable gliding sports apparatus according to claim 11, wherein the shoulder ribs, the arm ribs and/or the hand ribs are each formed from a flexible material.

13. Foldable gliding sports apparatus according to claim 1, wherein, above the main airfoil formed from back airfoil and arm airfoils or upper-arm airfoils and lower-arm airfoils, there is provided at least one further, flexible airfoil which is connected to the main airfoil, such that, between the main airfoil and the further airfoil, there are formed air chambers which extend in the intended direction of overflow.

14. Foldable gliding sports apparatus according to claim 1, wherein the foldable gliding sports apparatus is controllable by upper body and/or arms and/or hands and/or fingers.

* * * * *